Nov. 23, 1965 G. J. KOEHLER ETAL 3,219,312
CAM OPERATED VALVE HAVING PRELIMINARY ROCKING MOVEMENT
Filed Dec. 17, 1962
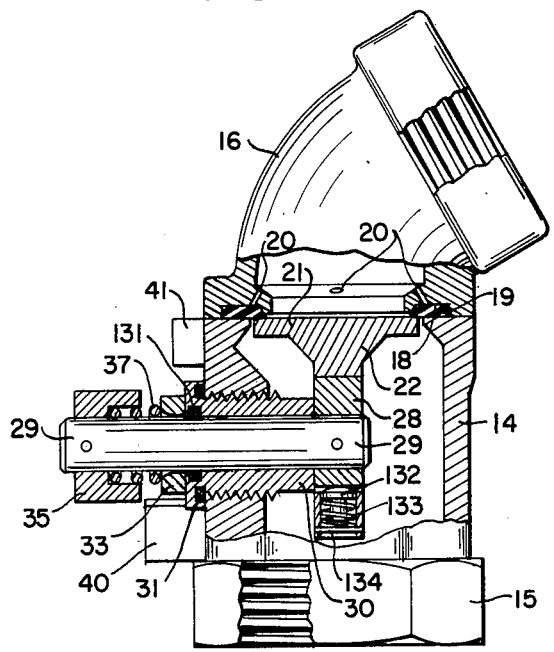
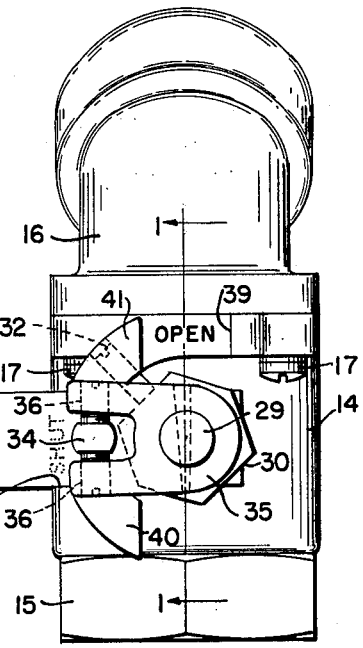
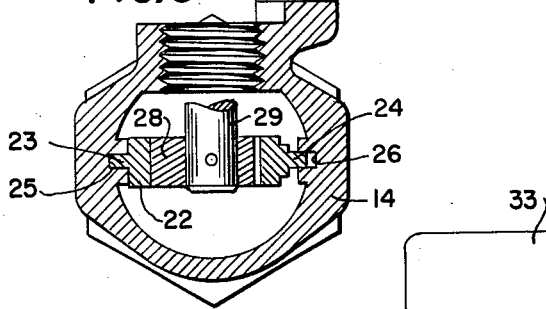
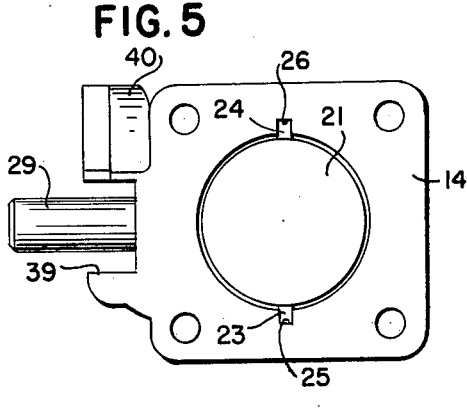
INVENTORS
GUSTAVE J. KOEHLER &
GORDON T. KOEHLER
BY *Richard Van Busum*
THEIR ATTORNEY 3,219,312
**CAM OPERATED VALVE HAVING PRELIMI-
NARY ROCKING MOVEMENT**
Gustave J. Koehler, Dayton, Ohio (769 NE. 77th Terrace, Miami, Fla.), and Gordon T. Koehler, 421 Acorn Drive, Dayton, Ohio
Filed Dec. 17, 1962, Ser. No. 245,272
1 Claim. (Cl. 251—229)

This invention relates to fluid valves and is particularly directed to a poppet type of fluid valve for use in the air lines of railroad cars and other similar uses.

It is the general object of the present invention to provide an improved type of valve for use in the compressed air lines of railroad cars, coaches and engines.

Another object is to provide an improved type of valve for use in the compressed air lines of railroad cars, said valve having a poppet type valve member which forms an effective leakproof seal and operates with ease under various conditions.

Another object is the provision of an improved type of valve for use in the compressed air lines of railroad cars, said valve having a cam operated, poppet type valve member which closes tightly to form an effective leakproof seal and which opens easily under various conditions of use and under various weather conditions.

Still another object is the provision of an improved type of valve for use in the compressed air lines of railroad cars, said valve having a poppet type valve member which is closed tightly by manual operation of a cam element in one direction to form a leakproof seal and is rocked slightly by initial operation of the cam element in the opposite direction to gradually disengage the face of the valve member from its seat and thus ease the operation of said valve under extreme pressure conditions and under various unfavorable operating conditions.

With these and incidental objects in view the invention includes certain novel features of construction and combinations of parts, a preferred form or embodiment of which is hereinafter described with reference to the drawings which accompany and form a part of this specification.

In the drawings:

FIG. 1 is a side elevation, partly sectioned, of the improved type of valve, the sectioned portion being taken along line 1—1 of FIG. 4, looking in the direction indicated by the arrows.

FIG. 2 is a right angle projection of the main body portion of the valve shown in FIG. 1 and illustrates, in particular, the operating cam for the poppet type valve member.

FIG. 3 is a cross section view taken along line 3—3 of FIG. 2, looking in the direction indicated by the arrows.

FIG. 4 is an elevation showing in particular the valve operating handle and its connection to the operating cam for the poppet type valve member.

FIG. 5 is a top plan view of the main body portion of the valve with the seat portion removed to better show the manner in which the poppet type valve member is mounted in said main body portion.

*Description*

The subject matter of the present invention is an improved type of fluid valve for use in the compressed air lines of railroad rolling stock such as cars, coaches, engines, etc.

Referring to the different figures of the drawings in which like reference numerals refer to like parts, the valve comprises a main body portion 14 having a hexagonal head 15 formed on the downward end thereof to receive a proper type wrench for applying the valve to the air line, said downward end having a threaded opening which communicates with the hollow interior of said body portion 14, said threaded opening providing means for attaching the valve to the air line at either end of the cars or other railroad equipment where it is desired to use the valve.

The air valve also includes an L-shaped seat portion 16 which is secured to the top face of the body portion 14 by suitable screws 17 (FIG. 4). The seat portion 16 (FIG. 1) has a circular groove 18 formed therein arranged to receive a combined seat and sealing washer 19 made of suitable plastic material which forms a leakproof connection between the seat portion 16 and the main body portion 14 upon proper tightening of the screw 17. The bottom surface of the seat washer 19 also serves as a seat for the top surface of a head portion 21 of a poppet type valve member 22. Like the interior of the main body portion 14, the interior of seat portion 16 is hollow to form a fluid passage, said opening being threaded near its outer end to receive a proper coupling for connection to the air line of the adjacent car.

A plurality of small holes 20 (FIG. 1) in a flange formed above the groove 18, provide an air passage between the hollow seat portion 16 and the groove 18 so that downward pressure will be applied to the sealing washer 19, when the air flow is in a downward direction, to assist in maintaining said washer in leakproof contact with the upper face of the valve member 22. Inasmuch as the air pressure may flow through the valve in either direction, depending upon which end of the car the valve is mounted, when the flow of air is in an upward direction, as viewed in FIG. 1, air pressure against the lower surface of the head 21 of the valve member 22 will force said valve member into firm engagement with the seat washer 19, in much the same manner as air pressure through the holes 20 when the air flow is in the opposite direction. In either case the valve member 22 is maintained in firm leakproof engagement with the seat washer 19.

The valve member 22 (FIGS. 2 and 3) has opposed guide rails 23 and 24 which snugly engage corresponding guide slots 25 and 26 formed in the hollow interior of the main body portion 14. It will be noted, by referring to FIG. 2, that the guide rail 24 is formed at a slight angle to the perpendicular to provide clearance at the lower end thereof which permits the valve member to rock or tilt slightly when it is being disengaged from the seat 19 to ease the operation of said valve member under conditions of pressure as will be explained more fully later. The valve member 22 has formed therein a cam opening 27 which coacts with the periphery of a cam 28 secured on an operating shaft 29 journaled in a bushing 30 (FIG. 1) threaded in the main body portion 14 and having a sealing ring 31 mounted in a groove formed in the head portion thereof, which in cooperation with the face of the body portion 14, forms a leakproof seal between said bushing and said body portion. The bushing 30 also has a groove formed in the interior thereof adjacent the bore for the shaft 29, to receive a sealing ring 131 which forms a leakproof connection between said bushing and the periphery of said shaft 29, to prevent the leakage of air therebetween. The downward surface of the opening 27 in the valve member 22 (FIGS. 1 and 2) has a bore which freely supports a plunger 132 and its associated compressible spring 133. A pin 134 extends across the center of the lower end of said bore and is secured in the sidewalls of the downward extension for said bore to form a stop for the spring 133 to cause it to urge the plunger 132 upwardly to maintain the rounded nose thereof in yielding engagement with the periphery of the cam 28. The spring-pushed plunger 132 serves to take up any lost motion between the cam 28 and the valve member 22, to effect smooth operation of said valve member under various pressure conditions and to assist in rocking said valve member out of engagement with seat washer 19 upon operation of the cam 28, as will be explained presently.

A handle 33 (FIGS. 1 and 4) is provided for operating the valve member 22, and said handle has a hole in the inner end thereof which freely engages the shaft 29. The handle 33 carries a stud 34 which extends outwardly between two adjusting screws 36 threaded in corresponding similar extensions formed on a valve operating collar 35 secured on the outer end of the shaft 29. A spring 37 (FIG. 1), coiled around the shaft 29, is compressed between the bottom of a counterbore in the inner surface of the collar 35 and the handle 33, and urges said handle inwardly to maintain it in yielding engagement with either of two slots 38 and 39 (FIGS. 4 and 5) formed in a semi-circular collar 40 extending outwardly from the face of the body portion 14 adjacent the shaft 29, to accurately maintain the valve member 22 in either its open or closed position. By referring to FIG. 1 it will be seen that the hole in the inner end of the handle 33 which engages the shaft 29 is countersunk on both sides and is provided with sufficient clearance so that said handle may be rocked outwardly against the action of the spring 37 to lift said handle out of either of the slots 38 or 39 (FIG. 4) and above a central lug 41 formed by the inner surfaces of said slots and during this lifting movement the stud 34 slides between the inner ends of the screws 36 which are adjusted to provide sufficient clearance for this sliding movement.

After the handle 33 has been raised out of the slot and sufficiently high to clear the central lug 41, it may be turned and through the stud 34, screws 36 and collar 35, turns the shaft 29 and the cam 28 in unison therewith. The cam 28 during its turning movement coacts with the cam opening 27 to shift the valve member 22 either downwardly or upwardly to open or close the valve. After the handle 33 has been turned approximately 90 degrees the edge of said handle comes into engagement with a corresponding lug extending outwardly from the collar 40 adjacent the outer surfaces of the slots 38 and 39 to interrupt the turning movement of said handle and to align it with the corresponding slot 38 or 39. Releasing the handle 33, after it has been turned to the proper position, permits the spring 37 to return the outer end of said handle inwardly into engagement with the slot 38 or 39, to firmly hold the valve member in either open or closed position.

The lug 41 has threaded therein a set screw 32 which is turned into firm engagement with a flat surface formed by the hexagonal head of the bushing 30 (FIG. 4) to hold said bushing against any tendency to turn. The hexagonal head of the bushing 30 also provides means by which a suitable wrench may be used to install or remove the bushing.

With the operating handle 33 in its horizontal position and engaged with the slot 38, as shown in FIG. 4, the cam 28 is positioned as shown in FIGS. 1 and 2 to hold the valve member 22 in its upward position in which the outer face of the head 21 thereof yieldingly engages the seat washer 19 with sufficient force to form a leakproof seal which effectively prevents the leakage of compressed air through the valve when it is in closed position. When the valve is on the front end of the car, that is, the end closest to the air source or engine, the compressed air flow is in a downward direction as viewed in FIGS. 1, 2 and 4 and in this case the holes 20 (FIG. 1) in the flange of the seat portion adjacent the washer recess 18 permit the air to press against the outer face of the sealing washer 19 and thus assist in forming a leakproof seal between the inner face of said seat washer and the head of the valve member 22. When the valve is on the rearward end of the car, that is, the end away from the source of air, the flow of the compressed air is upwardly as viewed in FIGS. 1, 2 and 4 and in this case the pressure of the air against the lower surface of the head 21 of the valve member 22 forces said valve member upwardly into firm yielding engagement with the seat washer 19 to form an effective leakproof seal.

To open the valve the handle 33 is lifted outwardly against the tension of the spring 37 (FIGS. 1, 2 and 4) and above the lug 41 and turned in a clockwise direction, as viewed in FIG. 4, from its horizontal position to its vertical position in which it is in alignment with the slot 39 whereupon releasing of said handle permits the spring 37 to return it inwardly into engagement with said slot 39 to hold the valve in open position.

Clockwise movement of the shaft 29 and the cam 28 (FIG. 2) as the handle 33 is operated, withdraws the high point or lobe of the cam 28 from the upper surface of the cam opening 27 and at the same time causes a lobe 42 formed on the lower surface of said cam to engage the lower surface at the point 43 of the cam opening 27 and assisted by the spring-loaded plunger 132, to impart a slight clockwise tilting or rocking movement to the valve member 22, due to the clearance provided by the angular rail 24, to gradually disengage the upper surface of the head portion 21 of the valve member 22 from the seat 19 beginning with the right hand portion of said head, as viewed in FIG. 2, to ease the opening of the valve member under extreme conditions of pressure and under various adverse weather conditions.

Without the above described rocking action of the valve member 22 it may be extremely difficult under certain conditions of pressure and weather to disengage the valve member from the seat washer 19, and this is believed to be a decided improvement in this type of valve when used in the compressed air lines of railroad rolling stock including cars, coaches and engines and is believed to constitute an advancement in the art which is entitled to patent protection.

If desired means may be provided for locking the handle 33 and the valve in open position, that is, when the handle is in its vertical position, as viewed in FIG. 4, and such means may be a slot (not shown) in the outer end of the handle 33 which engages a lug (not shown) formed on the seat portion 16, said lug having an opening therein to receive a suitable lock for locking said valve in its open position.

While the form of mechanism herein shown and described is admirably adapted to fulfill the objects primarily stated it is to be understood that it is not intended to confine the invention to the one form or embodiment herein disclosed for it is susceptible of embodiment in various forms to provide valves for various other uses including liquid fuel lines for aircraft and other analogous uses where a rugged type of quick acting valve is required which will operate successfully under various unfavorable conditions.

What is claimed is:

In a valve of the class described, the combination of a hollow body portion; a hollow seat portion connected to the body portion; a seat element mounted between the body and seat portions and effective to form a leakproof seal therebetween; parallel guide slots formed in the hollow interior of the body portion; a valve member adapted to sealingly cooperate with said seat element and having guide rails engageable with the slots to support said member for up and down shifting movement, one of said rails being slightly out of parallel or angular in relationship to its corresponding guide slot and to the other rail to support the valve member for slight preliminary rocking movement; a cam opening in the valve member; a shaft mounted in the body portion; a cam fast on the inner end of the shaft and coacting with the cam opening; manual means for operating the shaft and the cam in one direction to cause the cam to first rock the valve member slightly to gradually break said member away from the seat element and then to shift said member away from said element to open the valve, said operating means also effective for operating the shaft and the cam in the opposite direction to cause the cam to shift the valve member into engagement with the seat element to close the valve; and spring-loaded means mounted in the valve member engaging the cam to assist said cam in imparting initial rocking movement to said valve member.

References Cited by the Examiner

UNITED STATES PATENTS

| | | | |
|---|---|---|---|
| 662,503 | 11/1900 | Schmidt | 137—336 XR |
| 952,121 | 3/1910 | Koehler | 251—99 |
| 1,255,370 | 2/1918 | Wheaton | 251—99 |
| 1,769,621 | 7/1930 | Chace | 137—629 |
| 2,032,302 | 2/1936 | Novotny | 251—257 |
| 2,267,057 | 12/1941 | Verner | 251—257 |
| 2,662,721 | 12/1953 | Giauque | 251—257 |

ISADOR WEIL, *Primary Examiner.*